(12) United States Patent
Solar et al.

(10) Patent No.: US 6,347,233 B1
(45) Date of Patent: Feb. 12, 2002

(54) DIGITAL WAVEFORM GENERATOR APPARATUS AND METHOD THEREFOR

(75) Inventors: John Thomas Solar, Algonquin, IL (US); Alexander Wayne Hietala, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/569,418

(22) Filed: May 12, 2000

(51) Int. Cl.$^7$ .............................. H04B 1/38; H03K 3/17
(52) U.S. Cl. ...................... 455/553; 455/552; 455/102; 327/164
(58) Field of Search ................................ 455/552, 553, 455/102, 108, 110, 111, 561, 550; 375/305, 308, 302, 303; 327/164–166, 172, 175, 178, 184, 291

(56) References Cited

U.S. PATENT DOCUMENTS

| | | | |
|---|---|---|---|
| 3,749,834 A | * 7/1973 | Ellis ............................ | 327/14 |
| 3,842,354 A | 10/1974 | Dunne | |
| 5,093,632 A | 3/1992 | Hietala et al. | |
| 5,151,661 A | 9/1992 | Caldwell et al. | |
| 5,692,007 A | * 11/1997 | Durrant et al. ............. | 375/206 |
| 6,157,847 A | * 6/1999 | Buehrer et al. ............. | 455/561 |
| 6,239,636 B1 | * 5/2000 | Solar et al. ................. | 327/164 |
| 6,185,259 B1 | * 2/2001 | Dent ........................... | 375/261 |
| 6,222,828 B1 | * 4/2001 | Ohlson et al. .............. | 370/320 |

* cited by examiner

Primary Examiner—Nguyen T. Vo
Assistant Examiner—Duc Nguyen
(74) Attorney, Agent, or Firm—Michael C. Soldner

(57) ABSTRACT

A dual mode wireless device in which a coefficient generator (42) generates parameter values for a GSM waveform, based on transmitted sequences of digital data values from a GSM unit (34), using a multiplierless operation, and a waveform generator 44 generating the GSM waveform using the generated parameter values. The coefficient generator includes adder sections (132, 134, 136), each having corresponding adders (142, 144, 146) and multipliers (148, 150, 152), register sections (154, 156, 158), each containing parameters corresponding to a modulator (48), and transmit data registers (TXDATA[5]–TXDATA[0]) sequentially receiving the digital data values from the GSM unit. The coefficient generator generates the parameter values for the GSM waveform by multiplying each of the parameters in the register sections by a one or a negative one, responsive to the digital data values in the transmit data registers, and adding the resulting products to form corresponding coefficient generator output values.

20 Claims, 9 Drawing Sheets

DIGITAL WAVEFORM GENERATOR APPARATUS AND METHOD THEREFOR

FIELD OF THE INVENTION

The present invention relates generally to waveform generation, and more particularly to a method and apparatus for generating a digital waveform in a dual mode wireless device.

BACKGROUND OF THE INVENTION

A number of different standards and technologies for operating wireless telephones exist today. In order to operate properly, a wireless telephone must be within the boundaries of a wireless telephone system that supports the same technology and is able to operate at the same frequency as the wireless telephone. As a result, dual mode wireless telephones exist today that are designed for use in more than one wireless telephone system. For example, a wireless telephone that operates in both an Advanced Mobile Phone Service ("AMPS") mode and a Global System for Mobile Communication ("GSM") mode is known. The object of such dual mode combinations is generally to enable the user to transfer a wireless telephone outside of their home service area and increase the probability that the wireless telephone will continue to have wireless service available.

FIG. 1 is a schematic diagram of data transmission flow in a known dual mode wireless device operable in either the AMPS mode or the GSM mode. As illustrated in FIG. 1, a dual mode wireless device, such as a wireless telephone, includes a controller circuit 200 and a transmitter circuit 202 connected along a bus 204. Both analog and digital data signals, corresponding to voice and data, are input from a microphone 206 and an interface 208 of a computer device, for example, to a data source 210 located at the controller circuit 200. When the dual mode wireless device is operated in an AMPS mode, the analog signals from the microphone 206 are converted to digital data by an A/D converter 214 located in the AMPS unit 212, and added to the digital data input to the data source 210 by the interface 208 of the computer device using an adder 216. The resulting added signals output by the adder 216 are received by an input register 218 located within a digital signal processor 220 of the controller circuit 200.

On the other hand, when the wireless telephone is operated in the GSM mode, the analog signals output by the data source 210 after being received from the microphone 206 are converted to digital data signals by an A/D converter 224 located in a GSM unit 222, and both the digital data signals input by the data source 210 from interface 208 of the computer device and the digital data signals output from the A/D converter 224 are sent to an interleaver 226 of the GSM unit 222. The interleaver 226 interleaves the digital data signals according to GSM protocol. and outputs the interleaved data signals to the input register 218 of the digital signal processor 220.

Depending upon whether the device is being operated in the AMPS or the GSM mode, the digital data signals are transferred from the input register 218 to a microprocessor 228 of the digital signal processor 220 to be packaged and buffered to form processed data that is then output from the digital signal processor 220 to an output register 230 of the controller circuit 200. The processed data is held in the output register 230 until a new piece of data is required by the transmitting circuit 202, at which time the processed data is transferred from the output register 230 of the controller circuit 200 to the bus 204 connecting the controller circuit 200 to the transmitter circuit 202. The processed data is transferred along the bus 204 to an input register 232 of the transmitter circuit 202 and is transferred from the input register 232 to an interpolator 234. The interpolator 234 interpolates the processed data and outputs the resulting interpolated data to a modulator 236. The modulator 236 modulates the interpolated data, and the resulting modulated data is then output by the transmitter circuit 202 through an antenna (not shown).

In the prior art dual mode wireless telephone of FIG. 1, each time the transmitter circuit 202 requests a packet of data from the controller circuit 200, the requested data packet must be generated by the signal processor 220 and transported along the bus 204 from the output register 230 of the controller circuit 200 to the input register 232 of the transmitter circuit 202. As a result each time the transmitter circuit 202 requests a packet of data from the controller circuit 200, current processing from the signal processor 220 must be interrupted to enable the signal processor 220 to generate the data packet. As the rate of these interruptions increases, a bottleneck tends to form both between the signal processor 220 and the output register 230 of the controller circuit 200 and along the bus 204 between the controller circuit 200 and the transmitter circuit 202, corrupting reliability of the data transmission. This bottleneck results from noise that is caused from high clock rates at the bus 204, which desensitize the receiver receiving the output from the transmitter circuit 202, and from high current drain in MIPS (million instructions per second) between the digital signal processor 220 and the output register 230, which lowers the battery life of the device.

One method available to reduce the interrupt rate to the digital signal processor 220 caused by the requests for data from the transmitter circuit 202 is for the digital signal processor 220 to generate a large set of data and create a buffer at output register 230 from which the transmitter circuit 202 draws data in real time. As a result, the interruptions of the digital signal processor 220 are reduced, occurring only when the buffer required additional data. This buffer method reduces the interrupt rate to the digital signal processor 220, allowing more efficient operation so that lower MIPS are required by the digital signal processor 220, reducing current drain on the battery and increasing battery life. However, not all supported integrated circuits include the necessary buffer capacity built into the controller circuit 200.

In addition, the signal from the interpolator 234 could be pre-distorted using analog components in the present state of the art, in order to reduce the effects of distortion caused by bandwidth limitations in the modulator unit 236. To achieve analog pre-distortion and to achieve modulated signal accuracy and cleanliness, active operational amplifiers, switches, and extra inductors and capacitors may need to be added to the transmitter circuit 202 to obtain the required accuracy. These support circuits increase the size and cost of the transmitter circuit so that such as approach would be difficult and costly using current technology. In addition, even if support was available on the transmitter circuit 202, the higher data rate involved in transporting the high speed data from the output register 230 across the bus 204 to the input register 232 of the transmitter circuit 202 would cause radio interference back through the antenna, causing the radio to be de-sensitized.

Accordingly, what is needed is dual mode wireless telephone device that minimizes bottlenecks by reducing an interrupt rate of the signal processor while at the same time reducing interference in neighboring bands.

DETAILED DESCRIPTION OF THE PREFERRED EMBODIMENTS

Figure 1:
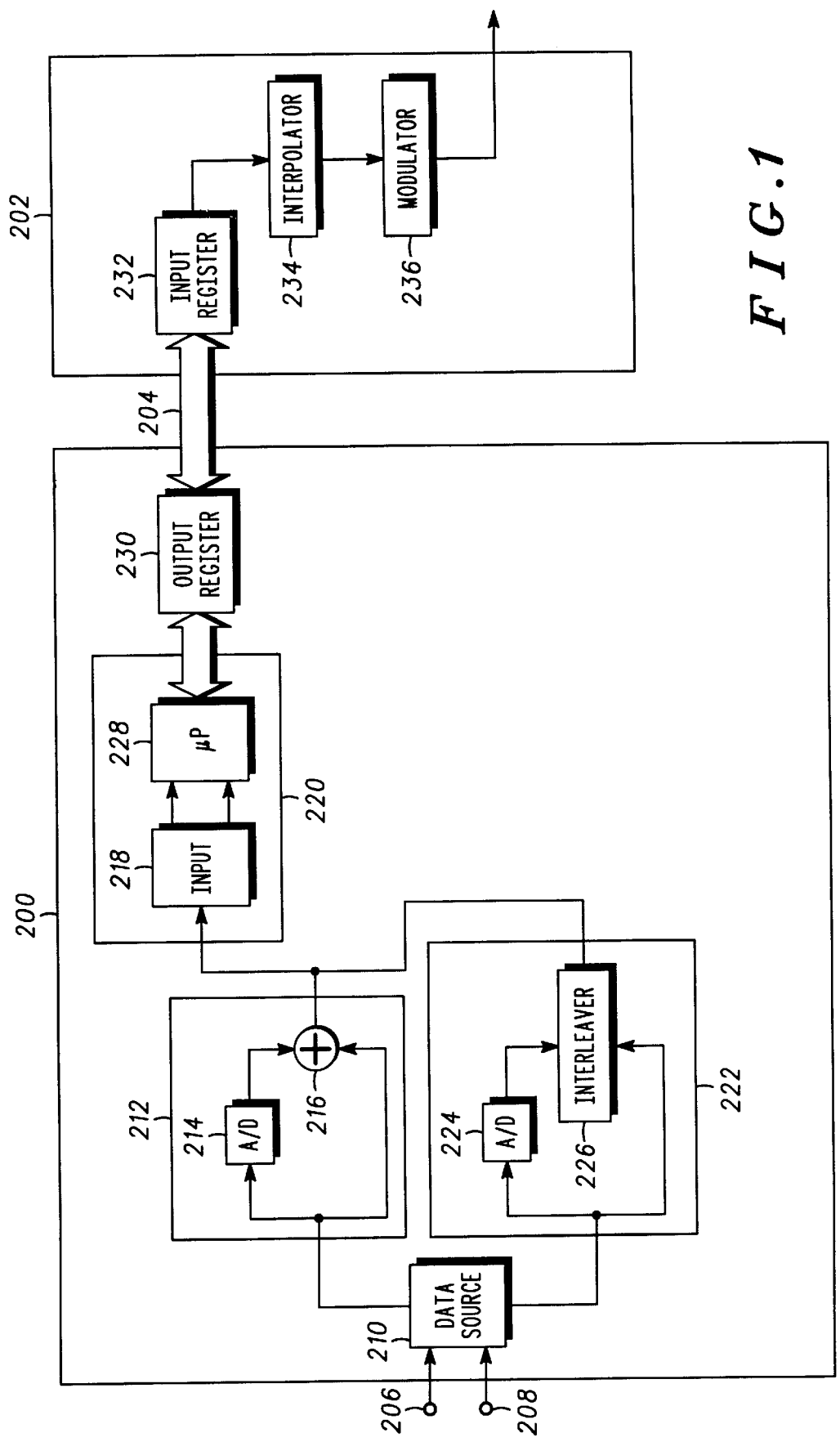
FIG. 1 (PRIOR ART) is a schematic diagram of data transmission flow in a known dual mode wireless device.
Figure 2:
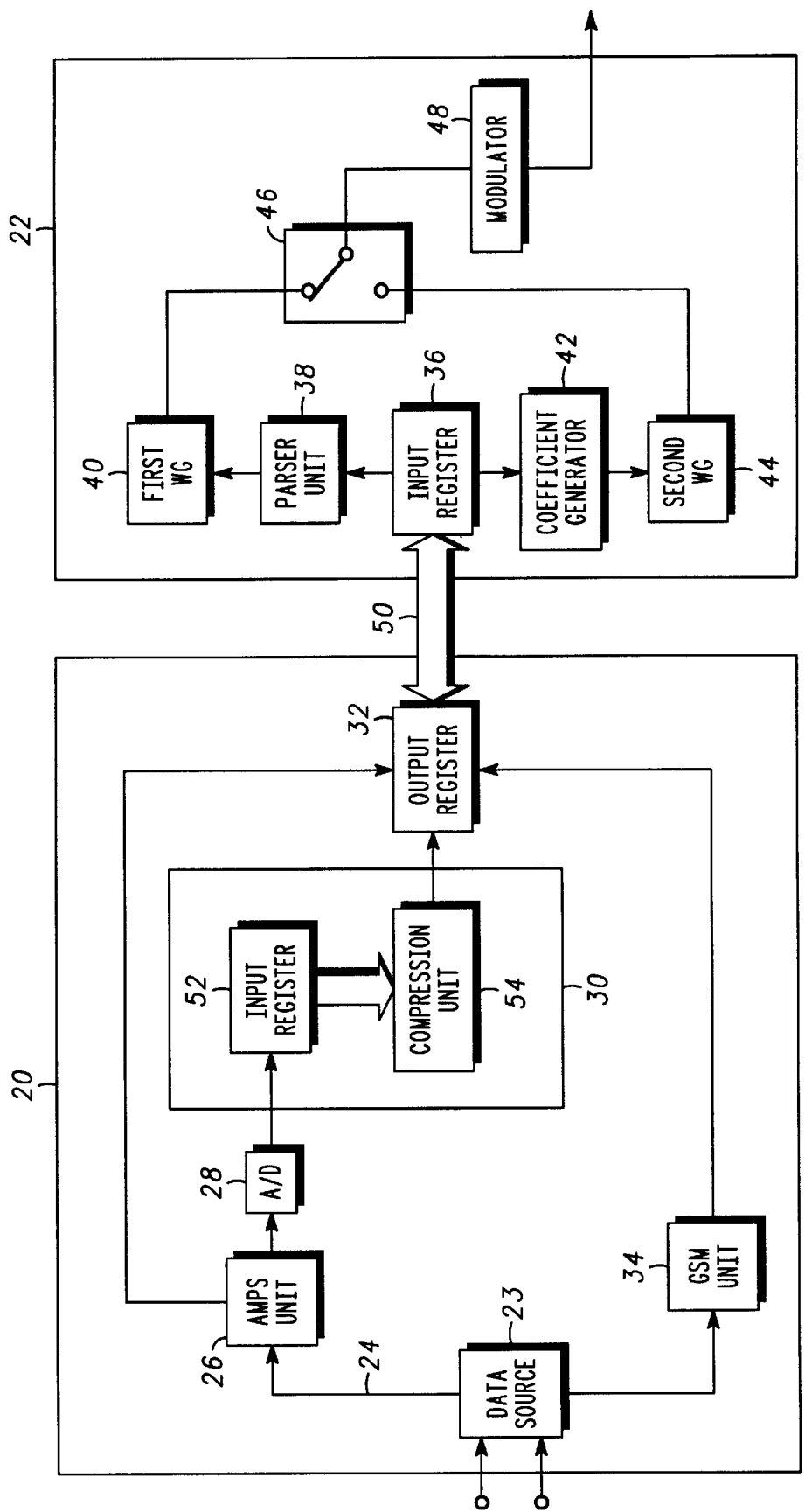
FIG. 2 is a schematic diagram of a dual mode wireless device according to the present invention.

FIG. 2 is a schematic diagram of a dual mode wireless device operable in either an AMPS mode or a GSM mode, according to the present invention. As illustrated in FIG. 2, a dual mode wireless device according to the present invention, such as a cellular telephone device, includes a controller circuit 20 and a transmitter circuit 22. The controller circuit 20 includes an AMPS unit 26 for processing analog and digital signals in the AMPS mode, an A/D converter 28, a digital signal processor 30, an output register 32, and a GSM unit 34 for processing analog and digital signals in the GSM mode. The transmitter circuit 22 includes an input register 36, a parser unit 38, a first waveform generator 40, a coefficient generator 42, a second waveform generator 44, a switch 46 for switching operation of the device between the AMPS and GSM modes, and a modulator 48. The distortion caused by modulator 48 can be corrected for by pre-distorting the signal generated by the waveform generators 40 and 44. Data corresponding to operation in either the AMPS mode or the GSM mode is transmitted along a bus 50 connecting the controller circuit 20 and the transmitter circuit 22.

Figure 3:
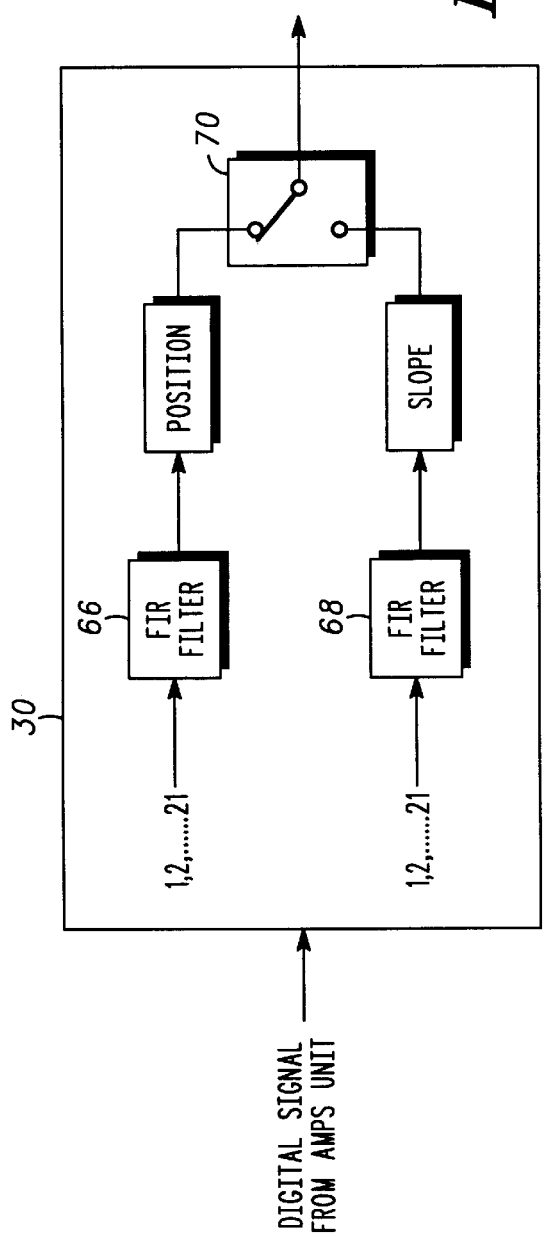
FIG. 3 is a schematic diagram of a digital signal processor of a dual mode wireless device according to the present invention.

FIG. 3 is a schematic diagram of a digital signal processor of a dual mode wireless device, according to the present invention. As illustrated in FIG. 3, the digital signal processor 30 includes finite impulse response (FIR) filters 66 and 68 and a switch 70. As illustrated in FIGS. 2 and 3, a time domain voltage representation is sent to the digital signal processor 30 from the digital signal output by the A/D converter 28. Based on this time domain voltage, the digital signal processor 30 generates parameters related to position, slope and feedback which are then output by the signal processor 30 to the output register 32 and transmitted along the bus 50 to the input register 36. The digital signal processor 30 evaluates the voltage of the digital signal and generates the parameters corresponding to operating requirements of the first waveform generator 40. An algorithm within the digital signal processor 30 then generates 12 bit position, 12 bit slope and 3 bit feedback parameters that are transferred to the first waveform generator 40.

The digital signal processor 30 algorithm must optimize the performance of the error in the time domain and frequency domain to meet the AMPS performance specifications. Available, straightforward, known determinations of instantaneous slope and position will not meet these requirements. Rather, a two-to-one decimation is beneficial in order to reduce bottlenecks that occur along the bus 50 between the controller circuit 20 and the transmitter circuit 22. Using the switch 70, the first waveform generator 40 interleaves the slope and position values, and thus misses every other occurrence of either slope or position. To reduce these effects, the digital signal processor 40 algorithm must take into account future errors in final output caused by the reduced data. A closed solution to this requires knowledge about future input values, not available at the time parameters must be sent to first waveform generator 40.

The present invention uses a matrix algebra model of the first waveform generator 40 in which the infinite linear algebra matrix model is appropriately truncated to create a transfer function approximation to the first waveform generator 40 operation. According to the present invention, the matrix approximation is solved using pseudo inverse approximation to a least squared error model of all possible inputs and outputs for the first waveform generator 40 to give an approximation to a linear transformation equivalent of the first waveform generator 40. A truncated version of the pseudo inverse gives the coefficients for a finite impulse response (FIR) filter equivalent to the precise infinite matrix solution needed to determine the parameters for the first waveform generator 40 inputs. There are a unique set of FIR filter coefficients generated for each of the eight feedback settings possible in the region of support of the FIR filter for the chosen 3 bit feedback bit size. These coefficients are determined off-line and become a part of the algorithm for the digital signal processor 30.

As illustrated in FIG. 3, according to the present invention, the digital signal processor 30 will then FIR filter the input digital signal using FIR filters 66 and 68. FIR filter 68 generates the slope parameters, and FIR filter 66 generates the position parameters for the first waveform generator 40. The pair of FIR filters 66 and 68 are run for each value of feedback chosen. For current drain versus distortion performance, a limited set of feedback values are chosen to compete—with the greater the number of possible values chosen, the greater the possibility that the distortion will be reduced. However, for each possible value not chosen, a corresponding amount of current drain is saved. For all possible feedback values chosen in the competition, the distortion is determined by comparing the error as the difference between the input and the waveform generator model output. The lowest current drain, and thus the lowest MIPS load on the digital signal processor 30, is for the special case of where the feedback is equal to zero. In this way, the present invention uses FIR filters to approximate the coefficients needed for a time domain waveform generator.

In particular, when the cellular telephone device of the present invention is operated in the AMPS mode, the feedback parameter is set to disconnect for audio data, or to an open connection so that feedback is a constant value. The digital signal processor 30 performs the evaluation by inputting a present data value of the digital signal along with the past twenty data values, and sends the twenty-one data values through the custom designed finite impulse response filter, FIR filter 66, to generate a first coefficient value corresponding to a slope value, which is sent to output register 32 through switch 70. When the next data is received by the digital signal processor 30, the oldest data value of the twenty-one data values is removed and the next data value is inserted, and the new twenty-one present data values are sent through FIR filter 68 to generate a second coefficient value corresponding to position, which is sent to output register 32 through switch 70, and the process continues again, with the oldest data value being replaced by the next data value.

According to the present invention, therefore, a set of algorithms are developed offline, outside the cellular phone, to generate the coefficients for the position and slope that will be used by the first waveform generator 40 to generate the required waveform. Once designed, the FIR filters 66, 68 are left as constants and integrated into the digital signal processor 30. While FIR filters are a generally known digital signal processing algorithm and are typically used to smooth data or eliminate noise, etc., according to the present invention, FIR filter 68, used to generate the second coefficients corresponding to position, is designed as a low pass noise reducing filter that tends to smooth the data, and FIR filter 66, used to generate the first coefficients corresponding to slope is actually more like a derivative filter that enhances the noise—least squares approximation to position and least squares approximation to slope.

As illustrated in FIG. 2, when the dual mode cellular telephone device of the present invention is operated in the AMPS mode, analog audio signals, for example, along with digital signals, are transmitted from a data source 23 along a path 24 to the AMPS unit 26. The AMPS unit 26 processes the analog signals and outputs a corresponding processed signal to the A/D converter 28. The A/D converter 28 converts the analog processed signals to digital signals, and outputs the digital signals to an input resister 52 of the digital signal processor 30. The digital signals are transferred from the input register 52 to a compression unit 54 which compresses the digital signals to generate parameters that are used by the first waveform generator 40 in the transmitter circuit 22. The compressed digital signals from the digital signal processor 30 are output to 15 bits of a 16 bit field of the output register 32 and transmitted along the bus 50 from the output register 32 to the input register 36 of the transmitter circuit 22. The 16 bit signal is sent from the input register 36 to the parser unit 38 of the transmitter circuit 22.

The parser unit 38 parses the 15 bits of the 16 bit field and determines which section of the first waveform generator 40 to send the 15 bit word based on a de-interleave process. The first waveform generator 40 decompresses the digital data and interpolates the resulting decompressed data up to the data rate required by the modulator 48. The modulator 48 modulates the waveform, and the resulting modulated waveform is output by the modulator 48 to a remote cellular telephone device through an antenna (not shown).

At the same time, a digital data stream generated when the cellular telephone device is operated in the AMPS mode is transmitted directly from the AMPS unit 26 of the controller circuit 22 to the $16^{th}$ bit of the 16 bit field of the output register 32, and along the bus 50 from the output register 32 to the $16^{th}$ bit of input register 36 of transmitter circuit 22. Input register 36 sends the single bit of digital data as part of the 16 bit word sent to the parser unit 38. Parser unit 38 updates the state history of its internal digital data state history stream and sends a function of the state history to the first waveform generator 40. The first waveform generator 40 produces an interpolated filtered data sequence to the modulator 48, as will be described below.

Figure 4:
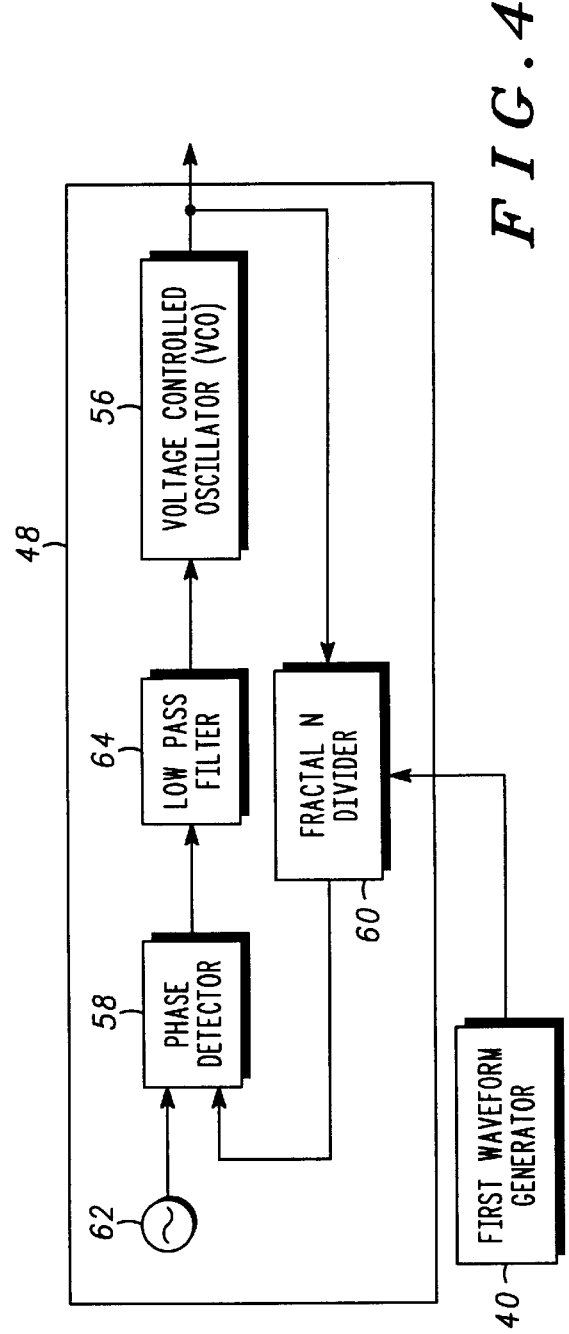
FIG. 4 is a schematic diagram of a modulator in a dual mode cellular telephone according to the present invention.

FIG. 4 is a schematic diagram of a modulator in a dual mode wireless device according to the present invention. As illustrated in FIG. 4, the modulator 48 is a constant amplitude frequency modulation (FM) modulator with phase coherency in which the frequency modulation is accomplished by a phase lock loop (PLL). The modulating element in this PLL is the divide by N in the feedback path from a voltage controlled oscillator 56 to a phase detector 58. Since non-integer division ratios are required for fine grain modulation, a fractional N (FN) divider 60 is used, such as disclosed in U.S. Pat. No. 5,093,632, for example. When phase locked, the PLL output frequency from the voltage controlled oscillator 56 is N times the reference frequency feeding the phase detector 58. In phase lock, the phase detector 58 receives a signal output by the FN divider 60 and using a reference oscillator 62, compares the phase of the two signals, and outputs a current proportional to the phase difference. A low pass filter 64 is positioned at the output of the phase detector 58 to filter high frequency noise contained in the output current of the phase detector 58. The stopband of the low pass filter 64 attenuates the high frequency noise and passes most of the intended signal from the phase detector 58, however, the signal output by the phase detector 58 is distorted by the passband of the low pass filter 64. The waveform generator can be set up to pre-distort the signal to precisely cancel the distortion caused by the low pass filter 64. The output of the low pass filter 64 drives the voltage controlled oscillator 56 which operates directly at the transmit frequency requiring no up conversion.

Figure 5:
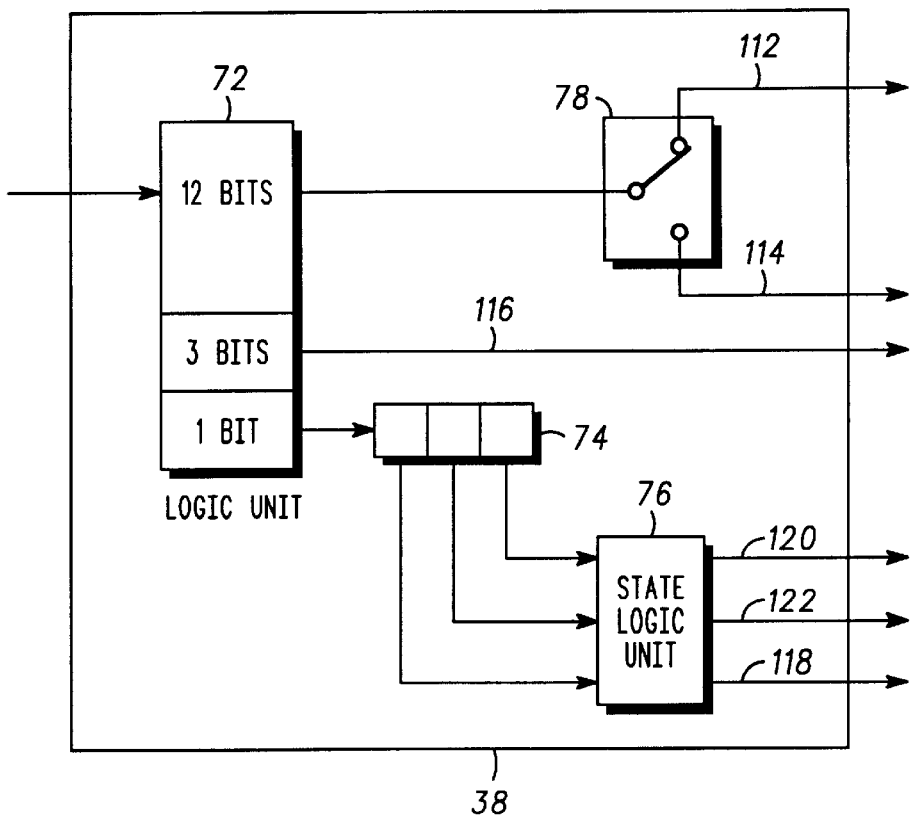
FIG. 5 is a schematic diagram of a parser unit of a dual mode wireless device according to the present invention.

FIG. 5 is a schematic diagram of a parser unit of a dual mode wireless device according to the present invention. As illustrated in FIG. 5, the parser unit 38 includes a logic unit 72, a state history register unit 74, a state logic unit 76, and a de-interleave switch 78.

Figure 6:
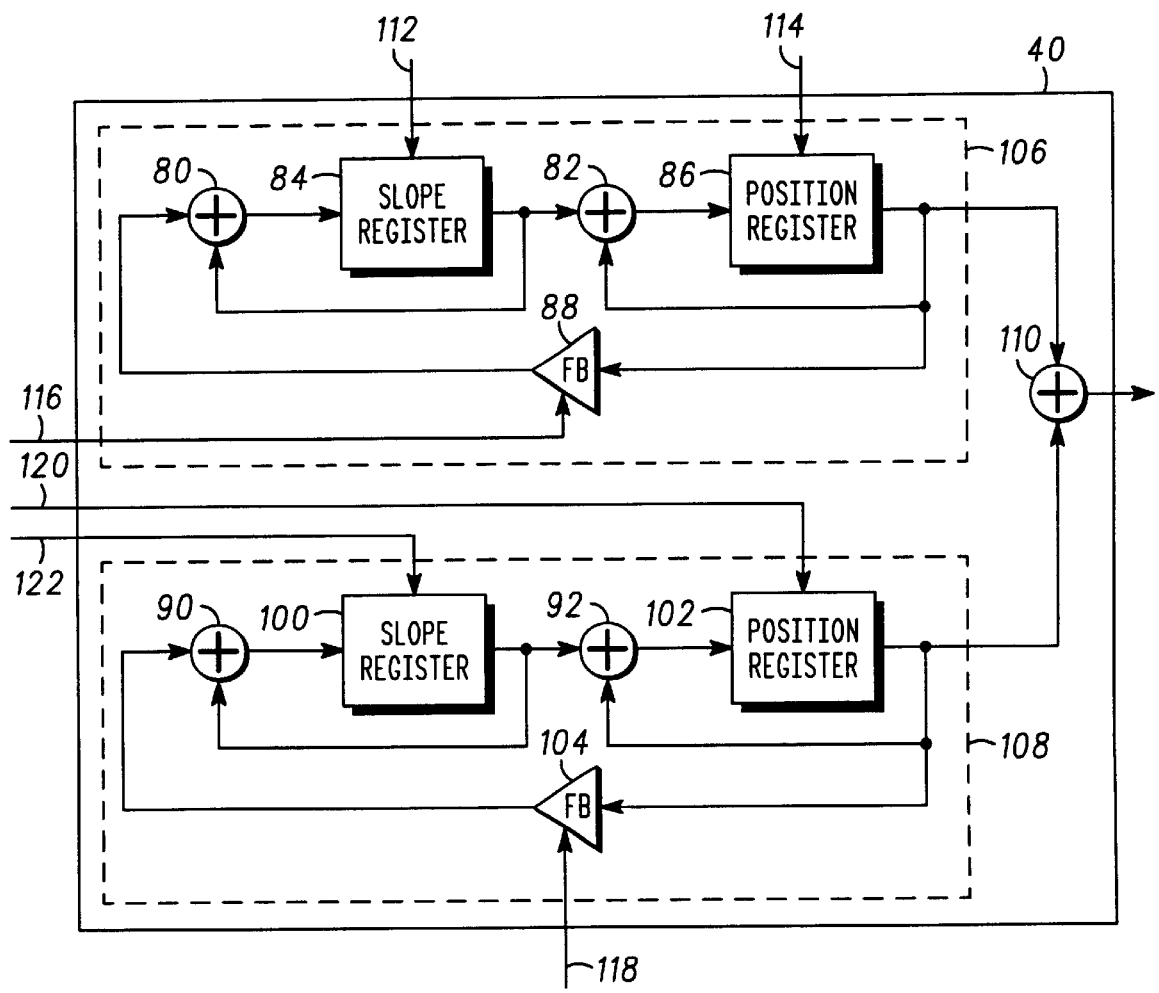
FIG. 6 is a schematic diagram of a waveform generator of a dual mode wireless device according to the present invention.

FIG. 6 is a schematic diagram of a waveform generator of a dual mode wireless device according to the present invention. As illustrated in FIG. 6, the first waveform generator 40 includes adders 80 and 82 connected in series with a slope register 84 and a position register 86, a feedback selector 88, adders 90 and 92 connected in series with a slope register 100 and a position register 102, and a feedback selector 104. Adders 80 and 82, slope register 84, position register 86 and feedback selector 88 form an audio waveform generator portion 106, and adders 90 and 92, slope register 100, position register 102 and feedback selector 104 form a data waveform generator portion 108. The outputs of the audio waveform generator portion 106 and data waveform generator portion 108 are combined using an adder 110 to form the output of the first waveform generator 40 consisting of the audio and Manchester signals combined.

In particular, as illustrated in FIGS. 5 and 6, after being sent to the parser unit 38 from input register 36, the 16 bit word is de-interleaved by the parser unit 38 using de-interleave switch 78. The logic unit 72 parses the 16 bit word into a 12 bit field, a 3 bit field, and a 1 bit field. The 12 bit field is de-interleaved by de-interleave switch 78 so as to be sent out as either a 12 bit slope value or a 12 bit position value, while at the same time the 3 bit field is sent out as a feedback value, and the 1 bit field is sent out as Manchester data. During synchronization, the de-interleave switch 78 is initialized at a slope setting, and toggles between a position and slope setting each time a 16 bit word is received. It is understood that although described as being initialized at the slope setting, it is possible for the de-interleave switch 78 of the present invention to be initialized at a position setting.

As a result, de-interleave switch 78 is positioned at a slope setting, as illustrated in FIG. 4, and logic unit 72 parses the initial 16 bit word into a 12 bit slope value, 3 bit feedback, and 1 bit Manchester data value. The 12 bit slope value is sent from the parser unit 38 to slope register 84 of the first waveform generator 40 along data path 112 from de-interleave switch 78, the 3 bit feedback value is sent along data path 116 from the logic unit 72 to feedback selector 88, and the 1 bit Manchester data is sent from logic unit 72 to state history register unit 74 of parser unit 38. When a subsequent 16 bit word is sent to the parser unit 38 from input register 36, the logic unit 72 parses the 16 bit word into a 12 bit position value, a 3 bit feedback value, and a 1 bit Manchester data value. De-interleave switch 78 is positioned so that the 12 bit position value is sent from parser unit 38 to position register 86 along data path 114 from de-interleave switch 78, the 3 bit feedback value is sent along data path 116 from the logic unit 72 to feedback selector 88, and the 1 bit Manchester data is sent from logic unit 72 to the state history register unit 74 of parser unit 38. The procedure is then repeated with de-interleave switch 78 positioned so that a 12 bit slope value is sent from the parser unit 38 to the first waveform generator 40, and so forth.

The state logic unit 76 uses the Manchester state history data of the state history register unit 74 to generate and send a single feedback value to feedback selector 104 along data path 118. This generated value determines whether a feedback value of approximately negative one will be used to close the feedback path of the data waveform generator 108, allowing oscillation to create a smooth sinusoidal trajectory of the interpolated Manchester signal. Output 120 of state logic unit 76 selects one of three values in position register 102 of data waveform generator 108, and output 122 of state logic unit 76 selects one of three slope values in slope register 100 of data waveform generator 108 of waveform generator 40. The updates from state logic unit 76 to data waveform generator 108 occur once every quarter cycle of the nominal 10 kHz Manchester rate. After each 16 bit word is sent from the digital signal processor 30, waveform generator 108 is run as many cycles as interpolation points are needed. For example, in a typical AMPS mode, twenty values are needed for each word sent.

According to the present invention, as illustrated in FIG. 6, the position registers 86 and 102 and the slope registers 84 and 100 are set up as accumulators, so that a next value is based upon a present value plus a new input. For example, a new position value is obtained by adding an old position value, i.e., a previous value output by the position register 102, to a new slope value output by the slope register 100, using adder 92. In the same way, a new slope value is obtained by adding an old slope, i.e., a previous value output by the slope register 100 to a previous position value that is scaled by hardware selected by the feedback value in feedback circuit 104, then added using adder 90.

This process is iterated twenty-five times to produce twenty-five interpolated values for modulator 48. Although, according to the present invention, twenty-five iterations are used, it is understood that the number of iterations chosen is based on the current drain and the modulator loop bandwidth, and therefore may be more or less than twenty-five, depending upon the specific application requirements.

Once twenty-five iterations values have been produced, a new slope and a new position value is output from the parser unit 38 to the waveform generator 40 and are used to generate the next twenty-five iterations, and so forth. In this way, the present invention uses a sine wave curve to move from one place to another, where a new position is obtained by adding a previous position and slope, and a new slope is obtained by adding an old slope and the scaled value of a previous position. As a result, by having negative feedback, an ideal digital oscillator is formed to enable a smooth transition from a plus 8 kHz position to a negative 8 kHz position using additions, rather than multiplication operations or look up tables as in the prior art cellular telephone device.

Figure 7:
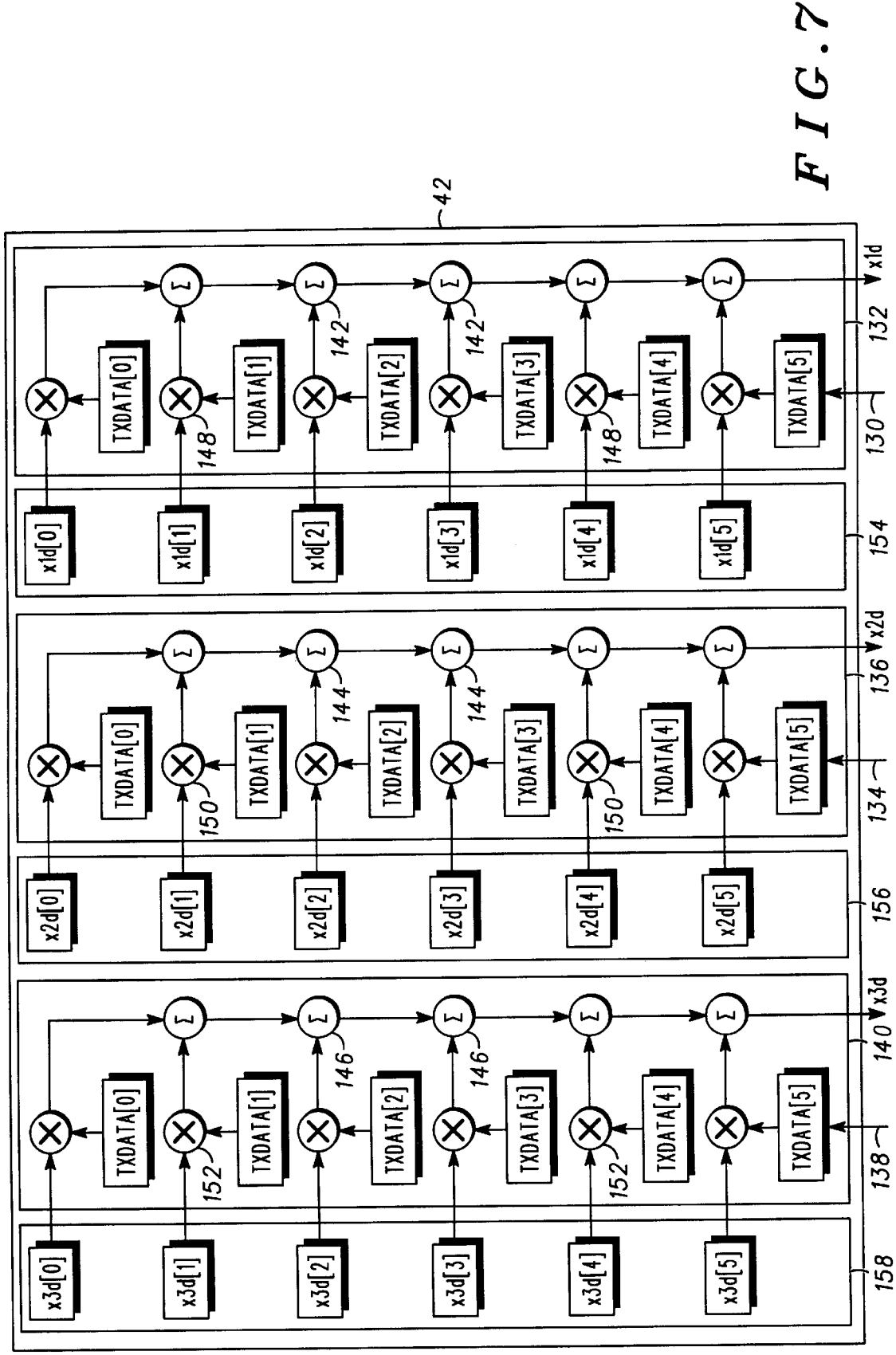
FIG. 7 is a schematic diagram of a coefficient generator of a dual mode wireless device according to the present invention.

FIG. 7 is a schematic diagram of a coefficient generator of a dual mode wireless device according to the present invention. As illustrated in FIG. 2, the coefficient generator 42 is positioned on the transmitter circuit 22 so that when the cellular telephone device of the present invention is operated in the GSM mode, digital data is transmitted in sequences of ones and zeros from GSM unit 34 of the controller circuit 20 to output register 32. The digital data is then transmitted along bus 50 to input register 36 of transmitter circuit 22, and from input register 36 to the coefficient generator 42.

As illustrated in FIG. 7, the coefficient generator 42 includes a first input 130 for inputting data into a first adder section 132, a second input 134 for inputting data into a second adder section 136 and a third input 138 for inputting data into a third adder section 140. Each of the adder sections 132, 136 and 140, respectively, includes five adders 142, 144 and 146 and six multipliers 148, 150 and 152.

During start up of the dual mode cellular telephone device of the present invention, eighteen parameters are loaded into a slope register section 154, an acceleration register section 156, and a jerk register section 158. The eighteen parameters are generated during design of the cellular telephone device, taking into account pre-distortion requirements of the transfer function of the phase lock loop of the modulator 48. As a result, six first derivative values x1d[0]–x1d[5] corresponding to slope are loaded in slope register section 154, six second derivative values x2d[0]–x2d[5] corresponding to acceleration are loaded in acceleration register section 156, and six third derivative values x3d[0]–x3d[5] corresponding to jerk are loaded in jerk register section 158. Only one value, as will be described below, is stored relative to position since position is constant and therefore a single value.

According to the present invention, when the dual mode cellular telephone device is operated in the GSM mode, a sequence of digital data values transferred from GSM unit 34 along bus 50 from output register 32 to input register 36 is received at inputs 130, 134 and 138. The digital data values are shifted sequentially into six transmit data registers TXDATA[5]–TXDATA[0] located in each adder section 132, 136 and 140, starting with transmit data register TXDATA[5]. Once six data values are shifted into transmit data registers TXDATA[5]–TXDATA[0] of adder sections 132, 136 and 140 for any instant in time, a slope value x1d, an acceleration value x2d, and a jerk value x3d is generated based on the inserted values and the eighteen parameters loaded in slope register 154, acceleration register 156 and jerk register 158. This generation of value x1d, x2d and x3d is performed by multiplying, using multipliers 148, 150 and 152, the parameters in slope register section 154, acceleration register section 156 and jerk register section 158 by a one or a negative one, depending upon the digital data value in corresponding transmit data registers TXDATA[5]–TXDATA[0].

For example, once six data values have been sequentially inserted in transmit data registers TXDATA[5]–TXDATA[0]

of adder sections 131, 136 and 140, slope value x1d is generated by multiplying, using multipliers 148, the six first derivative values x1d[0] to x1d[5] in slope register section 154 by a one or a negative one, determined by the value in transmit data registers TXDATA[5]–TXDATA[0] of adder section 132. The resulting positive and negative first derivative values x1d[0] to x1d[5] then added using corresponding adders 142. Similarly, acceleration value x2d is generated by multiplying, using multipliers 150, the six first derivative values x2d[0] to x2d[5] in acceleration register section 156 by a one or a negative one, determined by the value in transmit registers TXDATA[5]–TXDATA[0] of adder section 136. The resulting positive and negative second derivative values x2d[0] to x2d[5] are then added using corresponding adders 144 . In the same way, jerk value x3d is generated by multiplying using multipliers 152, the six third derivative values x3d[0] to x3d[5] in jerk register section 158 by a one or a negative one, determined by the value in transmit data registers TXDATA[5]–TXDATA[0] of adder section 140. The resulting positive and negative third derivative values x3d[0] to x3d[5] are then added, using corresponding adders 146.

For example, according to the present invention, if a sequence of 011010 is received at inputs 130, 134 and 138, the first stored slope value x1d[0] of slope register section 154 is added, the second and third slope values x1d[1] and x1d[2] are subtracted, the fourth slope value x1d[3] is added, the fifth slope value x1d[4] is subtracted, and the sixth slope value x1d[5] is added. Once the summation is completed, the resulting total sum of the slopes values x1d[0] to x1d[5] is output from coefficient generator 42 as the slope value x1d. Likewise, the same operation is performed to obtain the acceleration value x2d and the jerk value x3d so that the calculated slope, acceleration, and jerk values x1d, x2d, and x3d are all simultaneously loaded from coefficient generator 42 into the second waveform generator 44, along with the position value, which does not change based upon the sequence of data values.

Once the generated slope, acceleration, and jerk values x1d, x2d, and x3d are loaded into the second waveform generator 44, the digital data values in transmit data registers TXDATA[5]–TXDATA[0] located in each adder section 132, 136 and 140 are sequentially shifted so that the last inserted value is remove from transmit data register TXDATA[0], a new digital data value is inserted in transmit data register TXDATA[5], and the remaining values in transmit data registers TXDATA[1]–TXDATA[4] are shifted upward so that the value previously in transmit data register TXDATA[5] is shifted into TXDATA[4], the value previously in transmit data register TXDATA[4] is shifted into TXDATA[3], and so forth. In this way, once a new value is inserted, each adder section 132, 136 and 140 contains a newest value and five previous values. The process of either adding or subtracting each of the six values to generate the single slope value x1d, acceleration value x2d, and jerk value x3d based upon the sequence of values input from the controller circuit 20 to the coefficient generator 42 is then repeated.

As a result of the one bit per symbol nature of the GSM modulation definition, the present invention utilizes a multiplierless multiplication of the constants negative one and positive one. In the more general case, for instance, where there is multiple bits per symbol, or in CDMA or OFDM waveforms, a non-trivial multiplication would occur. A multiplication by a positive one is performed according to the present invention by simply adding, likewise a multiplication by a negative one is performed by simply subtracting. In this way, the dual mode cellular telephone device of the present invention uses a complete multiplierless operation implementation, without lookup tables, for generating a GSM waveform.

Figure 8:
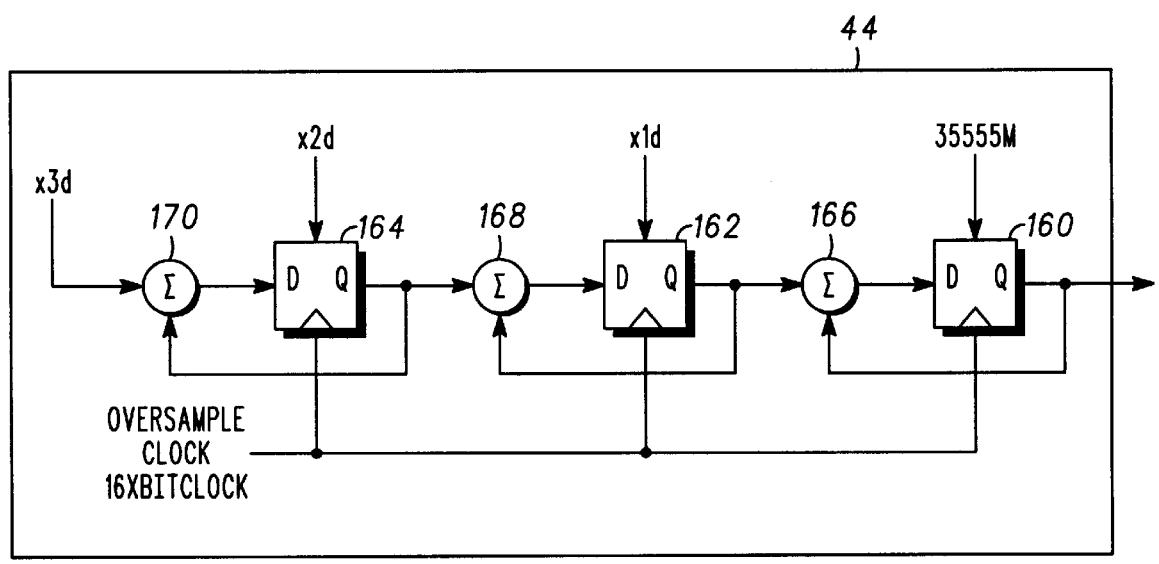
FIG. 8 is a schematic diagram of a waveform generator of a dual mode wireless device according to the present invention.

FIG. 8 is a schematic diagram of a waveform generator of a dual mode wireless device according to the present invention. As illustrated in FIG. 8, the second waveform generator 44 includes a position register 160, a slope register 162, and an acceleration register 164. According to the present invention, a fixed value of 35555H, corresponding to 67 kHz, is initially stored in the position register 160. The calculated values of slope x1d and acceleration x2d from the coefficient generator 42 are input into the slope register 162 and the acceleration register 164, respectively.

At each clock instant on a clock port during sixteen clock periods, the output of each of the registers 160, 162 and 164 is input sixteen times by an adder so that a new value is calculated by adding a present value of each register to the previous value of the preceding register. For example, a new value of position register 160 is generated by adding the present value of position to the previous value of slope output by slope register 162 using a first adder 166. A new value of slope register 162 is generated at each of the sixteen clock period by adding a present slope value to a previous value of acceleration output by acceleration register 164 using a second adder 168. In the same way, a new value of acceleration is generated at each of the sixteen clock periods by adding a present acceleration value to a previous value jerk x3d using a third adder 170. Once generated by the coefficient generator 42, jerk value x3d is held constant for the sixteen clock periods and therefore remains the same.

In this way, the registers are shifted on each sample of the clock and the adders from the previous stage are added in. Each new value of position register 160 generated at each clock period is output by second waveform generator 44 to the modulator 48. Once the sixteen clock periods have ended, a new generated value of slope x1d, acceleration x2d and jerk x3d from the coefficient generator are input by waveform generator 44 and the process is repeated for the next sixteen clock periods, and so forth.

Figure 9:
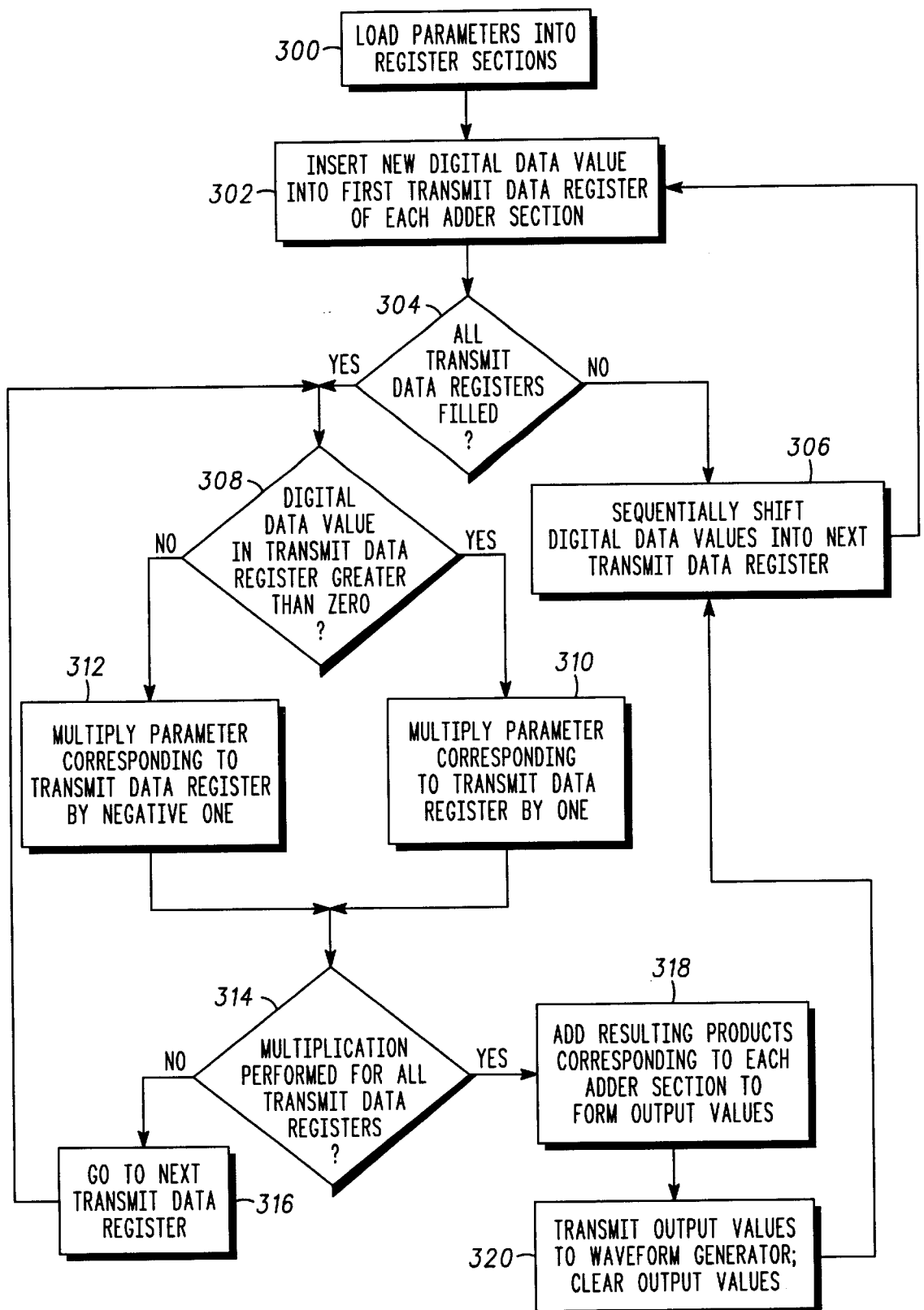
FIG. 9 is a flowchart of a method of generating a waveform in a dual mode wireless device according to the present invention.

FIG. 9 is a flowchart of a method of generating parameters for a waveform generator in a dual mode wireless device according to the present invention. As illustrated in FIG. 9, the eighteen parameters are loaded into slope register section 154, acceleration register section 156 and jerk register section in Step 300, and a new digital data value is inserted into first transmit data register TXDATA[5] of each adder section in Step 302. A determination as to whether all transmit data registers TXDATA[5]–TXDATA[0] are filled is made in Step 304, and if all transmit data registers are not filled, digital data values in transmit data registers TXDATA[5]–TXDATA[0] are sequentially shifted into the next transmit data register in Step 306, so that the digital data value in transmit data register TXDATA[5] is shifted into transmit data register TXDATA[4], transmit data register TXDATA[4] is shifted into transmit data register TXDATA[3], and so forth. The process then returns to Step 302 so that a new digital data value is again inserted into first transmit data register TXDATA[5] of each adder section.

If it is determined in Step 304 that all transmit data registers TXDATA[5]–TXDATA[0] are filled, a determination is made in Step 308 as to whether a digital data value in a transmit data register is a one or a zero by determining whether the value is greater than zero. If the digital data value is determined to be greater than zero, the parameter corresponding to the transmit data register is multiplied by one, Step 310, and if the digital data value is determined not to be greater than zero, the parameter corresponding to the transmit data register is multiplied by negative one, Step 312.

A determination is then made in Step 314 as to whether the process of multiplying the parameter corresponding to each of the transmit data register TXDATA[5]–TXDATA[0] by a one or a negative one has been performed, and if all multiplications by a one or a negative one have not been performed, the process goes to the next transmit data register, Step 316, and the returns to Step 308 so that the next transmit data register is multiplied by one or negative one, responsive to the digital data value in the corresponding transmit data register. If all multiplications by a one or a negative one have been performed, the resulting products corresponding to each of the adder sections 132, 136 and 140 are added, as described above, to form output values x1d, x2d, and x3d, Step 318. The output values x1d, x2d and x3d are transmitted to the waveform generator, and then cleared, Step 320 and the process returns to Step 306.

Figure 10:
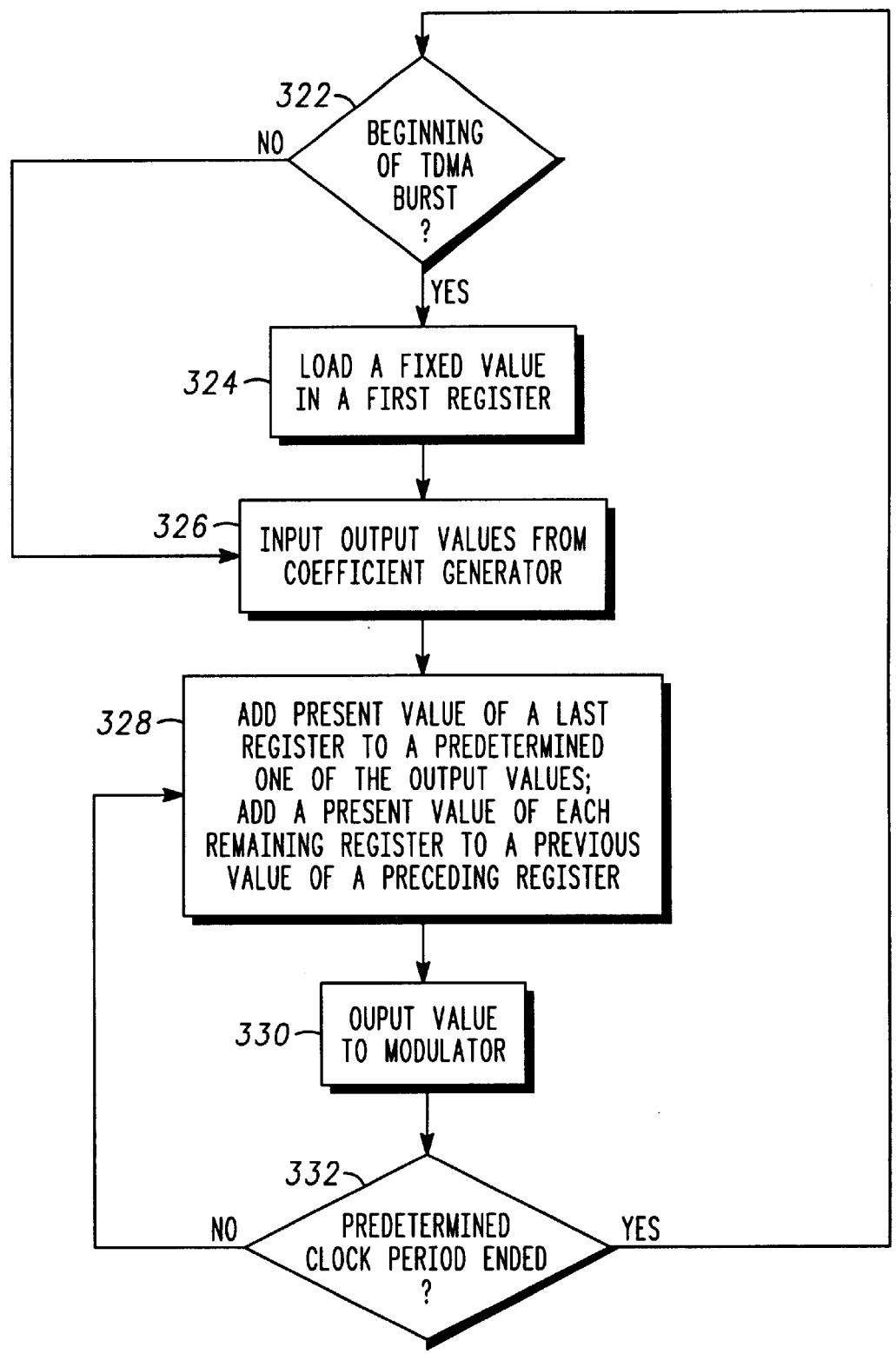
FIG. 10 is a flowchart of a method for generating a waveform using parameters generated in a dual mode wireless device according to the present invention.

FIG. 10 is a flowchart of a method for generating a waveform using parameters generated in a dual mode wireless device according to the present invention. Starting at the beginning of each frame, second waveform generator 44 begins generating the waveform using the method of the present invention. As illustrated in FIG. 10, a determination is made in Step 322 as to whether the transmission is at the beginning of a frame, such as a time division multiple access, or TDMA frame, and if the transmission is determined to be at the beginning of a frame, a fixed value is loaded into a first register, i.e., position register 160, in Step 324. Output values x1d, x2d and x3d from coefficient generator 42 are input by waveform generator 44, in Step 326. For each instant of the sixteen clock period, a present value of a last register, i.e., acceleration register 164, is added to a predetermined one of the output values, i.e., jerk value x3d, in Step 328. In addition, a present value of each of the remaining registers, i.e., position and slope register 160, 162, is added to a previous value of a corresponding previous register, in Step 328, so that a new output value for registers 160, 162 and 164 is generated at each clock period.

If it is determined in Step 322 that the transmission is not at the beginning of a frame burst, it is not necessary to load the fixed value into position register 160, and therefore the process continues at Step 326.

Each new generated output value for position register 160 is output by second waveform generator 44 to the modulator, Step 330, and a determination is made in Step 332 as to whether the clock period has ended. If the predetermined clock period has not ended, the process returns to Step 328 so that new output values for registers 160, 162 and 164 are generated for a next clock period and a new generated output value for position register 160 is output to modulator 48 Step 330. If it is determined in Step 332 that the predetermined clock has ended, the process returns to Step 322 an output value is transmitted from the waveform generator 44 to the modulator 48, and the process returns to Step 322.

Figure 11A:
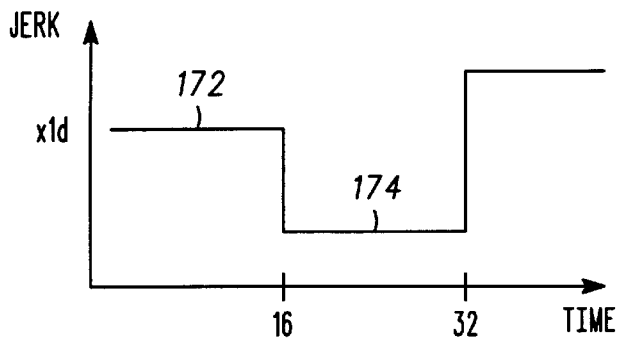
FIGS. 11a–d are graphic representations of a smoothing of a waveform by a waveform generator of a dual mode cellular telephone device according to the present invention.

FIGS. 11a–d are graphic representations of a smoothing of a waveform by a waveform generator of a dual mode wireless device according to the present invention. As illustrated in FIG. 11a, the new jerk value x3d remains constant for sixteen clock periods, illustrated by a first straight line portion 172. After sixteen clock periods a new set of values is input by the second waveform generator 44 from the coefficient generator 42, including a new jerk value that would then remain constant for sixteen clock values, illustrated by a second straight line portion 174. After those sixteen clock periods, the process would be repeated again, and so on.

Figure 11B:
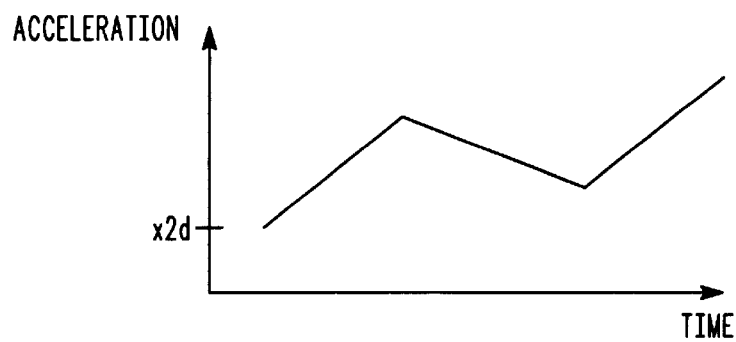

As illustrated in FIG. 11b, the acceleration starts initially at the acceleration value x2d calculated by the coefficient generator 42 and, rather than remaining constant during the sixteen clock periods, the acceleration at each of the sixteen periods would be the sum of the previous acceleration and the jerk. Since the jerk is constant, the acceleration would either ramp up or ramp down during the sixteen periods, depending upon whether the jerk is a positive or a negative value.

Figure 11C:
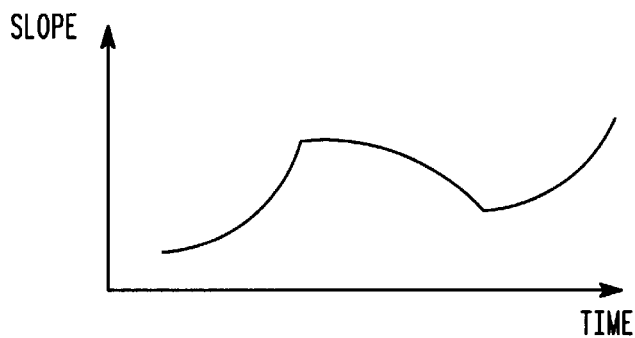

As illustrated in FIG. 11c, the slope starts initially at the slope value x2d calculated by the coefficient generator 42, and depending upon whether the acceleration and jerk is a positive or a negative value, the slope rises or falls at an ever increasing rate, so that a curvature begins to form.

Figure 11D:
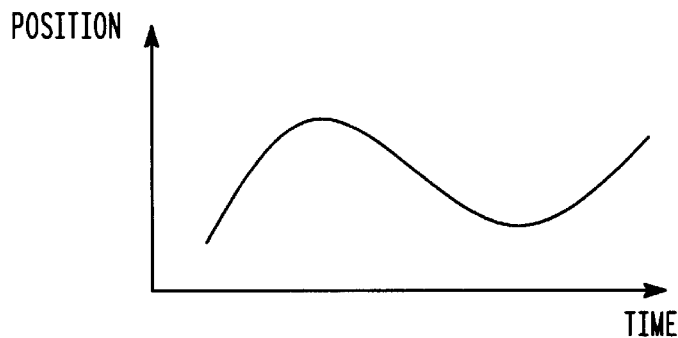

Finally, as illustrated in FIG. 11d, by performing successive integrations at each of the three registers 160, 162 and 164, once the process has been performed by the position register 160, a smooth, slowly moving waveform is formed. As a result, the second waveform generator 44 of the present invention generates a smooth tuning word so that frequency splatter is minimized and interference with neighboring telephones is reduced.

While a particular embodiment of the present invention has been shown and described, modifications may be made. For example, although the present invention is described in terms of utilizing a first, second and third derivative, any number of derivative values could be used. In addition, it understood that the coefficient generator of the present invention could include an additional adder section and corresponding position register section, to calculate the position value. It is therefore intended in the appended claims to cover all such changes and modifications which fall within the true spirit and scope of the invention.

What is claimed is:

1. A dual mode wireless device, comprising:
   a GSM unit transmitting sequences of digital data values;
   a coefficient generator generating parameter values for a GSM waveform, wherein digital data values of the sequences of digital data values are multiplied with parameter values of one or negative one based on the transmitted sequences of digital data values from the GSM unit, and added to generate the parameter values; and
   a waveform generator for generating the GSM waveform using the generated parameter values.

2. The dual mode wireless device of claim 1, further comprising a modulator modulating the GSM waveform generated by the waveform generator, wherein the coefficient generator further comprises:
   a plurality of adder sections, each having a plurality of adders and multipliers;
   a plurality of register sections, each containing parameters corresponding to the modulator; and
   a plurality of transmit data registers sequentially receiving the digital data values from the GSM unit, wherein the coefficient generator generates the parameter values for the GSM waveform by multiplying, using the multipliers, each of the parameters in the plurality of register sections by a one or a negative one, responsive to the data values in the plurality of transmit data registers, and adding the resulting products using adders to form corresponding coefficient generator output values.

3. The dual mode wireless device of claim 2, where the waveform generator further comprises a plurality of registers receiving the added resulting products from the coefficient generator, wherein a fixed value is stored in a first register of the plurality of registers, and wherein a new value output from a last register of the plurality of registers is generated by adding a present value of the last register and one of the coefficient generator output values, and a new value output from the remaining registers of the plurality of registers is generated by adding a present value of each of the remaining registers of the plurality of registers to a previous value of a corresponding preceding one of the plurality of registers.

4. The dual mode wireless device of claim 3, wherein the fixed value is equal to 35555H.

5. The dual mode wireless device of claim 2, wherein a new digital data value from the GSM unit is input by a first one of the plurality of transmit data registers, in response to the added resulting products being input by the waveform generator, and the digital data values in the plurality of transmit data registers are sequentially shifted.

6. The dual mode wireless device of claim 2, the modulator further comprising a voltage controlled oscillator, a phase detector and a low pass filter, wherein the modulator is a constant amplitude frequency modulation modulator with phase coherency in which frequency modulation is accomplished using a phase lock loop, and wherein a modulating element of the phase locked loop is a divide by N in a feedback path from the voltage controlled oscillator to the phase detector, and the low pass filter is positioned at an output of the phase detector to filter high frequency noise contained in output current of the phase detector.

7. The dual mode wireless device of claim 1, further comprising a modulator modulating the GSM waveform generated by the waveform generator, wherein the coefficient generator further comprises:
   a first adder section, having first transmit registers, calculating a first value, a second adder section, having second transmit registers, calculating a second value, and a third adder section, having third transmit registers, the transmit data registers sequentially receiving the digital data values from the GSM unit;
   a first register section containing predetermined first derivative values, a second register section containing predetermined second derivative values, and a third register section containing predetermined third derivative values, wherein the first value is calculated by multiplying each of the first derivative values by one or negative one in response to the digital data values in first transmit registers, the second value is calculated by multiplying each of the second derivative values by one or negative one in response to the digital data values in the second transmit registers, and the third value is calculated by multiplying each of the third derivative values by one or negative one in response to the digital data values in the third transmit registers.

8. The dual mode wireless device of claim 7, wherein the first derivative values, the second derivative values and the third derivative values are multiplied by one in response to the digital data values being equal to zero, and negative one in response to the digital data values being equal to one.

9. The dual mode wireless device of claim 7, wherein the digital data values in the transmit data registers are sequentially shifted, in response to the calculated values being input by the waveform generator, and a new digital value from the GSM unit is input by a first data transmit register of each of the first transmit data registers, the second transmit data registers, and the third transmit data registers.

10. The dual mode wireless device of claim 7, wherein the waveform generator further comprises:
   a first register receiving a fixed value, a second register receiving the first value, and a third register receiving the second value, wherein a new value for the first register is calculated by adding a present value of the first register to a previous value output by the second register, a new value for the second register is calculated by adding a present value of the second register to a previous value output by the third register, and a new value for the third register is calculated by adding a present value of the third register to the third value.

11. The dual mode wireless device of claim 10, wherein the fixed value is equal to 35555H.

12. The dual mode wireless device of claim 11, the modulator further comprising a voltage controlled oscillator, a phase detector and a low pass filter, wherein the modulator is a constant amplitude frequency modulation modulator with phase coherency in which frequency modulation is accomplished using a phase lock loop, and wherein a modulating element of the phase locked loop is a divide by N in a feedback path from the voltage controlled oscillator to the phase detector, and the low pass filter is positioned at an output of the phase detector to filter high frequency noise contained in output current of the phase detector.

13. A dual mode wireless device, comprising:
   a GSM unit transmitting sequences of digital data values;
   a first adder section, having corresponding first transmit data registers, generating a first value, a second adder section, having corresponding second transmit data registers, generating a second value, and a third adder section, having corresponding third transmit data registers, calculating a third value, the transmit data registers sequentially receiving the digital data values from the GSM unit;
   a first register section containing predetermined first derivative values, a second register section containing predetermined second derivative values, and a third register section containing predetermined third derivative values, wherein the first value, the second value and the third value is generated by multiplying each of the first derivative values, the second derivative values, and the third derivative values, respectively, by one in response to the corresponding digital values being equal to zero, and by negative one in response to the corresponding digital values being equal to one; and
   a waveform generator generating a waveform based on the generated first value, second value and third value.

14. The dual mode wireless device of claim 13, wherein the digital data values in the transmit data registers are sequentially shifted, in response to the calculated values being input by the waveform generator, and a new digital value from the GSM unit is input by the first transmit data registers, the second transmit data registers, and the third transmit data registers.

15. The dual mode wireless device of claim 14, wherein the waveform generator further comprises:
   a first register receiving a fixed value, a second register receiving the first value, and a third register receiving the second value, wherein a new value for the first register is calculated by adding a present value of the first register to a previous value output by the second register, a new value for the second register is calculated by adding a present value of the second register to a previous value output by the third register, and a new value for the third register is calculated by adding a present value of the third register to the third value.

16. The dual mode wireless device of claim 15, wherein the fixed value is equal to 35555H.

17. The dual mode wireless device of claim 16, the modulator further comprising a voltage controlled oscillator, a phase detector and a low pass filter, wherein the modulator is a constant amplitude frequency modulation modulator with phase coherency in which frequency modulation is accomplished using a phase lock loop, and wherein a modulating element of the phase locked loop is a divide by N in a feedback path from the voltage controlled oscillator to the phase detector, and the low pass filter is positioned at an output of the phase detector to filter high frequency noise contained in output current of the phase detector.

18. The dual mode wireless device of claim 17, wherein the predetermined first derivative values, second derivative values and third derivative values take into account pre-distortion requirements of the phase lock loop of the modulator.

19. A method of generating a waveform in a dual mode wireless device, comprising the steps of:

inserting digital data values into transmit data registers corresponding to each of a plurality of adder sections;

multiplying parameters corresponding to a modulator in each register of a plurality of register sections by one or negative one in response to the digital data values inserted in corresponding transmit data registers;

adding products resulting from the multiplying step corresponding to each of the plurality of adder sections; and outputting first output values, corresponding to each of the added products, to a waveform generator.

20. The method of claim 19, further comprising the steps of:

determining whether transmission is at the beginning of a frame burst;

loading a fixed value in a first register of the waveform generator in response to transmission being at the beginning of a frame burst;

inputting the first output values at corresponding registers of the waveform generator;

generating new output values by adding a present value of a last one of the registers and a predetermined one of the first output values, and adding a present value from each of the remaining registers to a previous value of a corresponding preceding one of the registers;

outputting the new output value generated by the first register to a modulator and determining whether a predetermined clock period has ended; and returning to the step of determining whether transmission is at the beginning of a frame burst in response to the predetermined clock period having ended, and returning to the generating step in response to the predetermined clock period not having ended.

* * * * *